Sept. 27, 1966 A. H. BOBECK 3,275,997
MAGNETIC INFORMATION STORAGE UNIT UTILIZING
CONDUCTIVE RING COUPLING
Filed Aug. 21, 1962 2 Sheets-Sheet 1

INVENTOR
A. H. BOBECK
BY William H. Kamstra
ATTORNEY

INVENTOR
A. H. BOBECK
BY
William H. Kamstra
ATTORNEY

United States Patent Office 3,275,997

Patented Sept. 27, 1966

3,275,997

MAGNETIC INFORMATION STORAGE UNIT UTILIZING CONDUCTIVE RING COUPLING

Andrew H. Bobeck, Chatham, N.J., assignor to Bell Telephone Laboratories, Incorporated, New York, N.Y., a corporation of New York Filed Aug. 21, 1962, Ser. No. 218,399
13 Claims. (Cl. 340—174)

This invention relates to electrical circuits and more particularly to electrical circuits employing open flux magnetic memory elements of, for example, the type described in copending application Serial No. 675,522, filed August 1, 1957, now Patent No. 3,083,353, for the present inventor.

Such magnetic memory elements may comprise, for example, an electrically conductive wire of a magnetic material displaying a substantially rectangular hysteresis characteristic about which is established a helical magnetic flux carrying path. An information bit is stored in such a magnetic wire memory element by passing a current through the electrically conductive wire itself and a coincident current through an electrical conductor inductively coupled to a portion of the electrically conductive wire for effecting thereabout the magnetic flux. The location of the information bit with respect to the electrically conductive wire, said location being termed the information address segment, is determined by the intersection of the electrically conductive wire with the electrical conductor. The extent of the information address segment along the electrically conductive wire is determined by the effective width of the electrical conductor there.

Information read out of such an information address segment is accomplished normally by sensing the voltage developed between the ends of the electrically conductive wire as coincident reverse currents are applied. The read-out process requires the subsequent restoration of the information back into the information address segment by well known additional circuit means.

It is an object of this invention to accomplish the read out of information by new and simpler means nondestructive in nature thus obviating the subsequent restoration of the information back into the information address segment.

A further object of this invention is the realization of a new and improved magnetic memory matrix.

The foregoing objects are realized in accordance with this invention by combining with each magnetic wire element at each information address segment thereon at least one highly conductive ring positioned coaxially with respect to the electrically conductive wire.

Although any of the forms of magnetic wire memory elements described in detail in the copending application of the present inventor referred to hereinbefore may be employed in the practice of this invention, in one illustrative embodiment thereof an electrically conductive wire of copper has wound helically thereabout a tape of magnetic material. As a consequence, there is provided about the copper wire a corresponding helical magnetic flux carrying path. The thus wound wire is combined with a sequence of electrical conductors or, alternatively, flat strip solenoids orthogonal thereto for defining a corresponding sequence of information address segments thereon. The electrically conducting wire includes thereabout spaced coaxial rings of copper or other suitable conducting material grouped along the wire within the confines of each address segment for effecting energetically changes in the magnetic flux there.

Thus, in accordance with one aspect of this invention, it is a feature thereof that at least one highly conductive element encircles and is in an energy coupling relationship with a magnetic flux path at a single information address segment thereon.

In accordance with another aspect of this invention, it is a feature thereof that a magnetic wire element having at least one information address segment thereon is encircled by at least one highly conductive coaxial ring at each address segment.

Still a further feature of this invention is a new and improved magnetic memory matrix wherein a parallel set of magnetic memory elements intersect a set of conductors defining an array of address segments characterized by at least one highly conductive ring associated with each address segment.

The foregoing and other objects and features of this invention will be understood clearly from a consideration of the detailed description thereof taken in conjunction with the accompanying drawing, in which.

It is to be understood that the figures are not necessarily to scale, certain dimensions being exaggerated conveniently for purposes of illustration.

Figure 1:
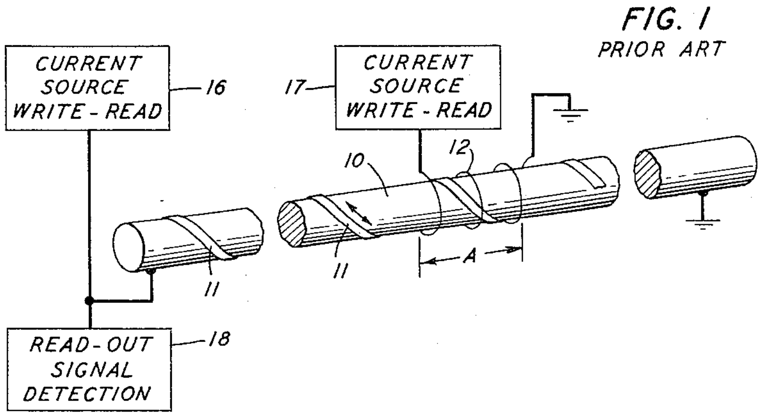
FIG. 1 PRIOR ART
FIG. 1 depicts a portion of a magnetic wire memory element of the prior art including an information address segment thereon.

As shown in FIG. 1, a magnetic wire memory element comprises an electrically conductive wire or conductor 10 about which is wrapped helically a flat tape 11 of a material having a substantially rectangular hysteresis characteristic thus forming about the conductor 10 a corresponding helical flux carrying path. In one embodiment of this invention a copper wire having a diameter of the order of .003 inch and a flat tape of 479 moly-Permalloy .003 by .0003 inch were found satisfactory for this purpose.

In the memory element shown in FIG. 1, one end of the electrically conductive wire or conductor 10 is connected to ground and the other end is connected to a suitable source of current 16. An insulated electrical conductor 12, also connected at one end to ground and at the other end to a suitable source of current 17, is inductively coupled to the electrically conductive wire or conductor 10 by its winding, there defining an information address segment. The current sources 16 and 17 may be of any type well known in the art and, accordingly, are shown only in block symbol form. In practice, the function of the insulated conductor 12 may be performed by a single insulated copper conductor or flat strip solenoid passing at an angle with the conductor 10 and inductively coupled thereto.

Figure 2:
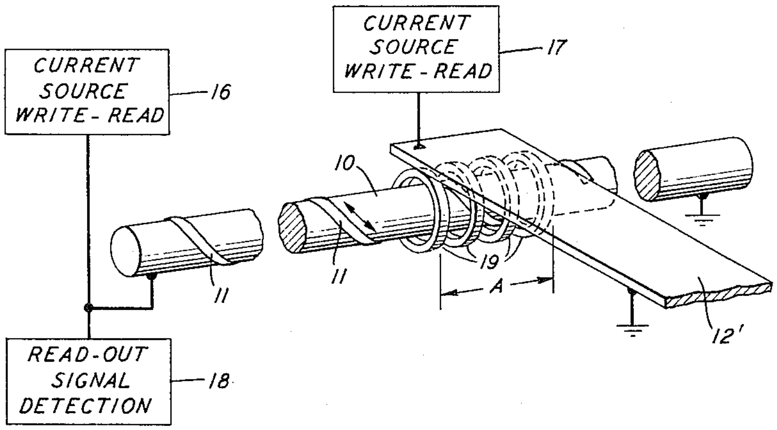
FIG. 2 depicts a portion of a magnetic wire memory element including an information address segment thereon together with the highly conductive rings in accordance with this invention.

Such a flat strip solenoid 12' is shown in FIG. 2, providing thereby a more simple schematic for illustrating the combination therewith of the highly conductive rings in accordance with this invention. The highly conductive rings 19 extending along the address segment A divide the latter into ringed areas and between-ring areas which for the selected wire material and geometry are of a magnetically unstable length. The remaining elements shown in the figure are numbered to correspond to their equivalents of FIG. 1.

Assume the presence in the address segment A of a flux in the helical path of one direction, a current, then, must be applied of a magnitude and polarity sufficient to generate a magnetomotive force which will switch the direction of flux in an opposite direction. The magnitude of this force may be determined as $h$. When a current pulse producing a magnetomotive force of the magnitude $h/2$ is now applied from the source 16 of a polarity to oppose the helical flux simultaneously with a current pulse producing a magnetomotive force of the magnitude $h/2$ from the source 17, the total magnetomotive force will be sufficient to switch the flux state of the address segment. The polarity of the current pulse required from the source 17 will depend upon the sense of the winding of the solenoid 12'. The flux state to which the address segment has been thus switched may be regarded as a particular information bit, say a binary "1," which it is desired to store and this operation would constitute the write phase of the memory function. It should be noted that, in accordance with the principles of coincident current memory elements generally, either of the current pulses applied from the source 16 and 17 alone will be insufficient to accomplish the magnetic switching. The two directions of flux in the helical path are indicated in FIG. 1 by double-ended arrows. Because of the presence of highly conductive rings 19 around the conductor 10 at the address segment, force $h$ is applied for a longer duration than would be necessary for writing in information in the absence of such rings. The counter fields induced in the highly conductive rings oppose any change in flux which occurs in the address segment thus requiring a magnetomotive force of a relatively long duration for countering such opposition and attaining a suitable equilibrium therebetween. It is the opposition to flux changes as provided by highly conductive rings 19 which enables the nondestructive read out in accordance with this invention as described more fully below.

Information stored in the address segment is read out by reversing the polarity of the currents applied from the current sources 16 and 17. The simultaneous reverse current pulses tend to switch the direction of magnetization in the address segment if an information bit has been previously stored in the manner described above. Obviously, if in the write phase of operation the address segment had not been magnetically switched for whatever reason, no switching can occur during the read-out phase. When the magnetic state of the address segment is switched, a change in the potential between its ends will result. This change may be detected by suitable detection means 18 as an output pulse superimposed upon the switching current pulse applied to the conductor 10. When the magnetic state of the address segment is not reversed with respect to polarity, as would be the case, say if a binary "0" had been stored, an irrelevant noise signal may be generated.

Read out may also be accomplished by simply overdriving the solenoid 12 by a current producing a sufficient reverse magnetomotive force applied from the current source 17 alone. In this case the conductor 10 itself would act only as a read-out lead, the output signal also being detected by the means 18. This means of read out is particularly adaptable in the employment of the memory element of this invention in the formation of memory arrays as will be described in detail hereinafter.

In either case, the magnetic fields generated by the read-out current tend to change the magnetic flux of the address segment. However, the highly conductive rings 19 oppose this change. Specifically, during the read-out pulse sufficient energy is stored in the rings and the magnetically unstable between-ring areas to reset on the termination of the read-out pulse that portion of the magnetic flux which reverses in response to the read-out pulse. Consequently, the rings permit the use of an advantageously larger amplitude read-out pulse than is possible in the absence of the rings and at the same time obviate the necessity of a reset operation.

It is, of course, possible to store many bits of information along a single magnetic wire memory element. The allowable number of such bits would be determined by the coercive force, the saturation flux density, and the physical dimensions of the conductor, to name a few of the considerations involved.

Figure 3:
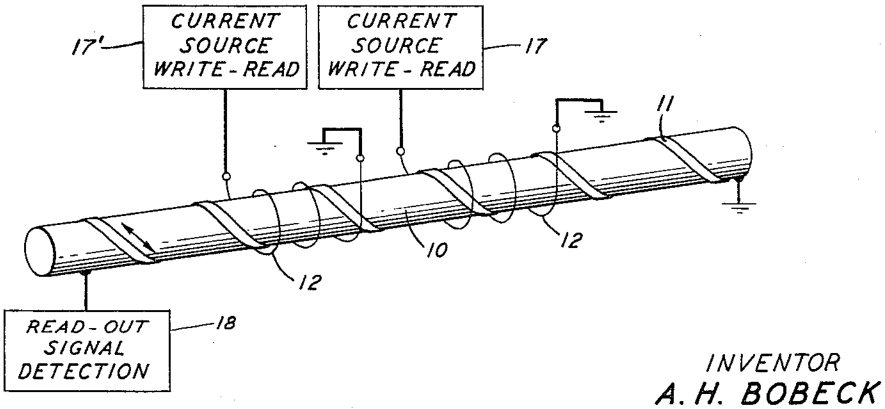
FIG. 3 PRIOR ART
FIG. 3 depicts a magnetic memory element of the prior art including a plurality of information address segments thereon.

The memory element shown in FIG. 3 is a prior art arrangement in connection with which another illustrative application of the principles of this invention is described. Specifically, FIG. 3 shows a two-address arrangement of the circuit shown in FIG. 1 in which the conductor 10 is adaptable for direct replacement for a conventional coincident current toroidal core. To make such a replacement complete in detail, an additional sensing lead would be inductively coupled to the conductor 10 in addition to the write conductors 12 shown. However, more advantageously, the conductor 10 itself may be used as the sensing wire. In FIG. 3, the conductor 10 is shown as also having a tape 11 wound helically thereabout forming a corresponding substantially helical flux path. A pair of insulated conductors 12 are here inductively coupled to the conductor 10 in the same sense. Each of conductors 12 is connected at one end to ground and is connected at the other end to a current source, such as the sources 16 and 17, respectively, also employed in connection with the embodiment of FIG. 1. The conductors 12 are shown connected to current sources 17' and 17 in FIG. 3. An additional conductor (not shown in FIG. 3) connects conductor 10 to current source 16 as shown in FIGS. 1 and 2. When current pulses of the same polarity, each producing a magnetomotive force of the magnitude $h/2$, are coincidentally applied from the sources 16 and 17 and/or source 17', a magnetic flux will be induced in the corresponding address segment of tape 11. The direction of that flux will be determined by the sense of the windings of conductors 12 and the polarities of the applied coincident current pulses. The flux direction or polarity, of course, will determine the character of the particular information bit stored in the corresponding memory element. It should here also be noted that a current pulse as above applied from either source 16 or from source 17' or source 17 alone will be insufficient to switch or establish a magnetization in the flux path. Read out in this case is accomplished by reversing the polarity of the current pulses applied from sources 16 and 17 or 17' in order to switch the magnetization in the address segment written in by the current pulses previously described. The voltage induced across the ends of the conductor 10 is then read by the detection means 18 shown as connected to one end of the conductor 10 in FIG. 3. The voltage induced by the magnetization switch may also be read from an external sensing lead, not shown, as suggested above. Here, too, each of conductors 12 is replaced conveniently by a single insulated copper conductor or solenoid passing at an angle with conductor 10 and inductively coupled thereto.

Figure 4:
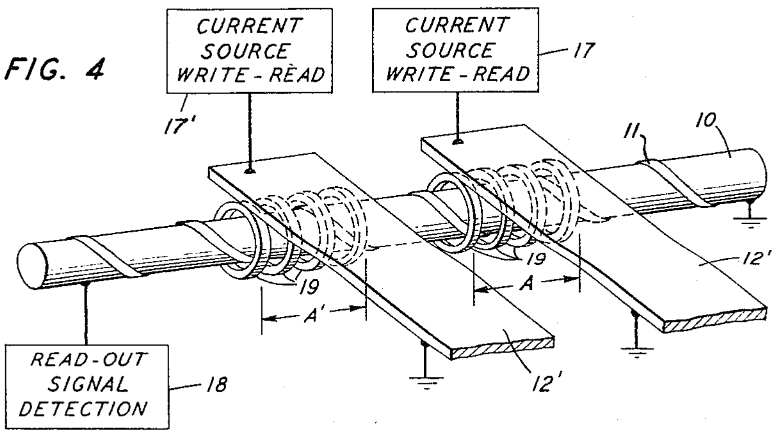
FIG. 4 depicts a magnetic memory element including a plurality of information address segments thereon together with the highly conductive rings in accordance with this invention.

Such single insulated copper conductors or solenoids 12' are shown in FIG. 4. The highly conductive rings 19 associated with each of the conductors 10, where intersected by solenoids 12', divide the area of conductor 10 thereunder into ringed and between-ring areas and are absented entirely from the portion of conductor 10 which lies between address segments A and A'.

Figure 5:
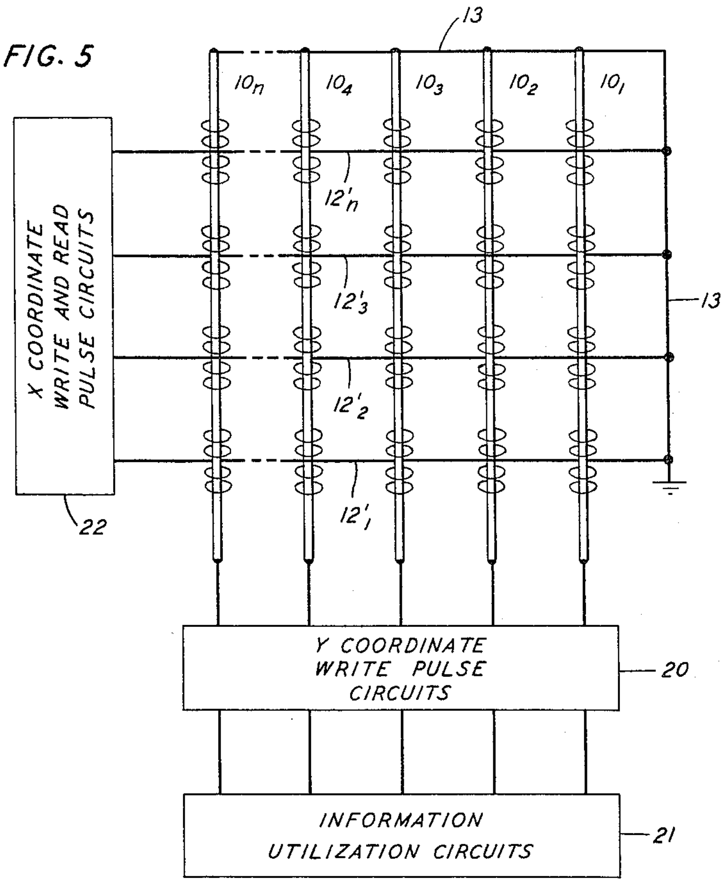
FIG. 5 depicts a magnetic memory matrix comprising a plurality of magnetic memory elements and associated highly conductive rings in accordance with this invention.

A magnetic memory element according to this invention is highly advantageous as a basic element in the fabrication of a coordinate memory array such as the illustrative array shown in FIG. 5. Such an array comprises simply a lattice of transverse parallel conductors 10 which comprise the memory elements and parallel insulated copper conductors or solenoids 12'. One end of each of the conductors 10 and 12' is connected to a ground bus 13. The other end of each of the transverse parallel conductors 10 is connected to suitable $y$ coordinate write pulse circuits 20. Such circuits are well known in the magnetic memory and information handling art and in this case would produce appropriately timed current pulses of a magnitude to generate an $h/2$ magnetomotive force with respect to the conductors 10. In addition, each of the conductors 10 is also connected to information utilization circuits 21 capable of accepting binary coded output pulses. Such circuits will also present themselves to one skilled in the art and do not require detailed description.

The other end of each of the solenoids 12' is connected to suitable $x$ coordinate write and read current pulse circuits 22 also well known in the art and similar in operation to the write pulse circuits included in the block 20. The illustrative memory array of FIG. 5 is word-organized, that is, the information bits of each word stored appear at the portions of the conductors 10 inductively coupled to the solenoids 12'. In the writing operation in the array the word level is selected by applying a current pulse of the proper magnitude to a selected $x$ coordinate solenoid 12'. Simultaneously, the particular bit information is introduced by pulsing the $y$ coordinate conductors 10 in accordance with the bits of the word to be stored. The read operation is performed simply by applying a read current pulse of opposite polarity to that of the write current pulse and of proper magnitude to only the particular $x$ coordinate solenoid 12' defining the row in which the word appears. Output signals will then appear in parallel form at the terminals of the conductors 10 which contained thereabout the information bits of the word read out. The association of highly conductive rings 19 with each portion of the tape 11 which is inductively coupled to the solenoids 12' enables storage of sufficient energy there to reset, on termination of the read-out pulse, that portion of the magnetic flux which reverses in response to the read-out pulse. As is stated above, the particular conductor 10 contemplated in the foregoing description of an illustrative matrix may be, for example, any one of the magnetic conductors having a helical flux path thereabout as described in the above-identified application. In addition, wire memory elements having longitudinal flux paths thereabout such as described, for example, in the copending application of U. F. Gianola, Serial No. 690,478, filed October 16, 1957, now Patent No. 3,069,661, are also adaptable in accordance with this invention.

A magnetic memory matrix such as that described may be fabricated conveniently by weaving the solenoids 12' together in a manner similar to that also employed in the fabrication of a wire mesh or screen. The facility of well known methods of weaving then may be made available to obviate tedious and time consuming threading methods generally available only in the fabrication of conventional toroidal core memories.

It should be obvious to one skilled in the art that the highly conductive element described above in accordance with this invention need not be highly conductive rings of circular cross section as shown but may have a variety of shapes. It is necessary only that there be associated with each information address segment at least one highly conductive element which forms a closed conducting path and permits the passage of magnetic flux therethrough for affecting a memory element which it encircles. Examples of such elements are rings with square, oval, or rectangular cross sections and webbed tubular structures. If it is desired to use a plurality of spaced rings as described in the foregoing, as many rings can be used as will allow the between-ring areas to remain a magnetically unstable length. Typically, four rings are used. However, a greater number of rings would be suitable.

What have been described are considered to be only illustrative embodiments of the present invention and it is to be understood that numerous other arrangements and modifications as well as other applications may be devised by one skilled in the art without departing from the spirit and scope of this invention.

What is claimed is:

1. A memory device comprising
an electrically conductive wire having a magnetic flux carrying path thereabout,
electrical conducting means coupled to said wire and defining an information address segment thereon, and
at least one highly conductive ring encircling said wire and inductively coupled thereto at said address segment.

2. A device in accordance with claim 1 wherein said magnetic flux carrying path is helical.

3. In combination, a magnetic wire memory element having a substantially rectangular hysteresis characteristic,
an electrical conductor intersecting said memory element defining on said memory element an address segment, and
a plurality of highly conductive rings coaxial with said memory element at said address segment.

4. In combination, a magnetic wire memory element having a substantially rectangular hysteresis characteristic,
at least one electrical conductor intersecting said memory element defining on said memory element at least one address segment, and
a plurality of spaced apart highly conductive rings coaxial with said memory element at said address segment.

5. A combination in accordance with claim 4 wherein said highly conductive rings are spaced apart along said memory element within said address segments such as to define between-ring areas of magnetically unstable lengths.

6. In combination, a magnetic wire memory element having a substantially rectangular hysteresis characteristic,
a plurality of electrical conductors intersecting said memory element defining on said memory element at the intersections a corresponding plurality of address segments, and
a plurality of spaced apart highly conductive rings coaxial with said memory element at said address segments.

7. A combination in accordance with claim 6 wherein said plurality of spaced apart highly conductive rings are spaced apart a distance so as to define along said memory element a corresponding plurality of between-ring areas of magnetically unstable lengths.

8. A magnetic memory circuit comprising a magnetic wire memory element having a substantially rectangular hysteresis characteristic,
an inductive winding means coupled to said element and defining an address segment thereon,
means for applying an energizing pulse to said winding means to generate a magnetic field at said address tending to switch the magnetic flux in said element at said address segment, and
a plurality of highly conductive rings about said element at said address segment for inhibiting said flux from switching in response to said magnetic field.

9. In combination, a magnetic memory wire element having a substantially rectangular hysteresis characteristic,
a plurality of spaced apart electrical conductors orthogonal to said magnetic memory wire element and inductively coupled thereto for defining address segments thereon,
means for applying an energizing pulse to said magnetic wire memory element,
means for applying an energizing pulse to each of said electrical conductors, and
a plurality of highly conductive rings coaxial with said magnetic memory wire element at each of said address segments.

10. An information storage matrix comprising a plurality of magnetic memory elements each having a substantially rectangular hysteresis characteristic and each having a substantially helical magnetic flux carrying path established therein, a plurality of transverse electrical conductors inductively coupled to each of said memory elements, each of said electrical conductors defining an address segment on each of said magnetic conductors, at least one highly conductive ring encircling said magnetic memory elements at each of said address segments, means for selectively applying an energizing pulse to particular ones of said plurality of magnetic memory elements, and means for selectively applying an energizing pulse to particular ones of said plurality of electrical conductors.

11. An information storage matrix comprising a plurality of magnetic wire memory elements each having a substantially rectangular hysteresis characteristic and each having a substantially helical magnetic flux carrying path established therein, a plurality of transverse electrical conductors inductively coupled to each of said memory elements, each of said electrical conductors defining an address segment on each of said memory elements, a plurality of highly conductive rings coaxial with each of said memory elements at each of said address segments, means for selectively applying an energizing pulse to particular ones of said plurality of memory elements, and means for selectively applying an energizing pulse to particular ones of said plurality of electrical conductors, said energizing pulses on said ones of said memory elements and said ones of said electrical conductors combining to determine a particular condition of remanent magnetization in said helical flux path at particular ones of said address segments.

12. An information storage matrix in accordance with claim 11 also comprising means for applying a current pulse of an opposite direction to the conductors defining a particular address tending thereby to switch the condition of said remanent magnetization at said particular address segment, said highly conductive rings resisting this tendency to switch.

13. An information storage matrix in accordance with claim 12 also comprising means for detecting voltage changes in said magnetic memory elements.

References Cited by the Examiner

UNITED STATES PATENTS

| | | | |
|---|---|---|---|
| 3,060,411 | 10/1962 | Smith | 340—174 |
| 3,069,661 | 12/1962 | Gianola | 340—174 |
| 3,083,353 | 3/1963 | Bobeck | 340—174 |
| 3,175,200 | 3/1965 | Hoffman | 340—174 |
| 3,177,473 | 4/1965 | Schoenmakers | 340—174 |

BERNARD KONICK, *Primary Examiner.*

M. S. GITTES, *Assistant Examiner.*